Figure 1:
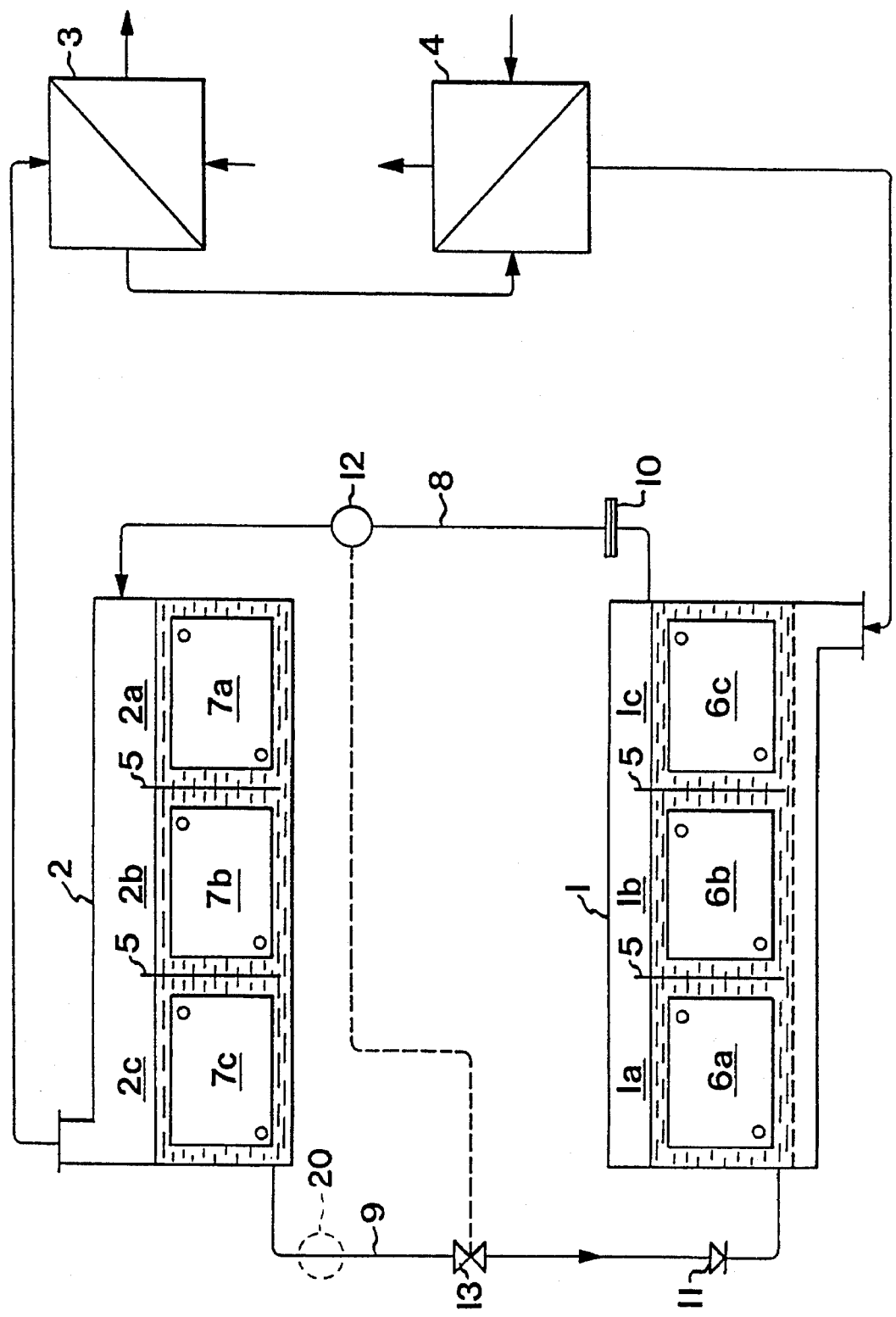

United States Patent [19]
Jernqvist et al.

[11] Patent Number: 5,600,968
[45] Date of Patent: Feb. 11, 1997

[54] ABSORPTION MACHINE WITH MULTI-TEMPERATURE COMPARTMENTS

[75] Inventors: Åke Jernqvist, Lund; Klas Abrahamsson, Sollentuna; Anders Gidner, Lund, all of Sweden

[73] Assignee: Chematur Engineering Aktiebolag, Karlskoga, Sweden

[21] Appl. No.: 448,499

[22] PCT Filed: Dec. 15, 1993

[86] PCT No.: PCT/SE93/01072
§ 371 Date: Jun. 5, 1995
§ 102(e) Date: Jun. 5, 1995

[87] PCT Pub. No.: WO94/14017
PCT Pub. Date: Jun. 23, 1994

[30] Foreign Application Priority Data

Dec. 15, 1992 [SE] Sweden ................. 9203775

[51] Int. Cl.⁶ ............... F25B 15/12; F25B 15/00
[52] U.S. Cl. ................... 62/484; 62/489; 62/497
[58] Field of Search ............... 62/101, 103, 476, 62/489, 494, 497, 484

[56] References Cited

U.S. PATENT DOCUMENTS

| | | | |
|---|---|---|---|
| 1,798,946 | 3/1931 | Maiuri et al. | 62/497 |
| 3,396,549 | 8/1968 | McGrath | 62/489 |
| 3,817,050 | 6/1974 | Alexander et al. | 62/101 |
| 3,831,397 | 8/1974 | Mamiya | 62/476 |
| 3,928,983 | 12/1975 | Ainbinder et al. | 62/101 |
| 3,990,263 | 11/1976 | Ainbinder et al. | 62/476 |

FOREIGN PATENT DOCUMENTS

| | | |
|---|---|---|
| 3426674 | 1/1986 | Germany . |
| 414540 | 8/1980 | Sweden . |
| 470412 | 2/1994 | Sweden . |

*Primary Examiner*—William Doerrler
*Attorney, Agent, or Firm*—Burns, Doane, Swecker & Mathis, LLP

[57] ABSTRACT

An absorption machine and a method for operating the machine are disclosed. The absorption machine comprises an absorber (1) with heat-exchanger assemblies and a generator (2) with heat-exchanger assemblies, the generator (2) and the absorber (1) being interconnected by two conduits (8, 9). The absorber (1) and/or generator (2) are divided into at least two compartments which are in communication with one another and in which the different heat-exchanger assemblies have separate inlets and outlets. By means of the inventive machine, heating media of different temperatures can be obtained from the absorber (1) and waste heat of different temperatures can be used in the generator (2).

29 Claims, 2 Drawing Sheets

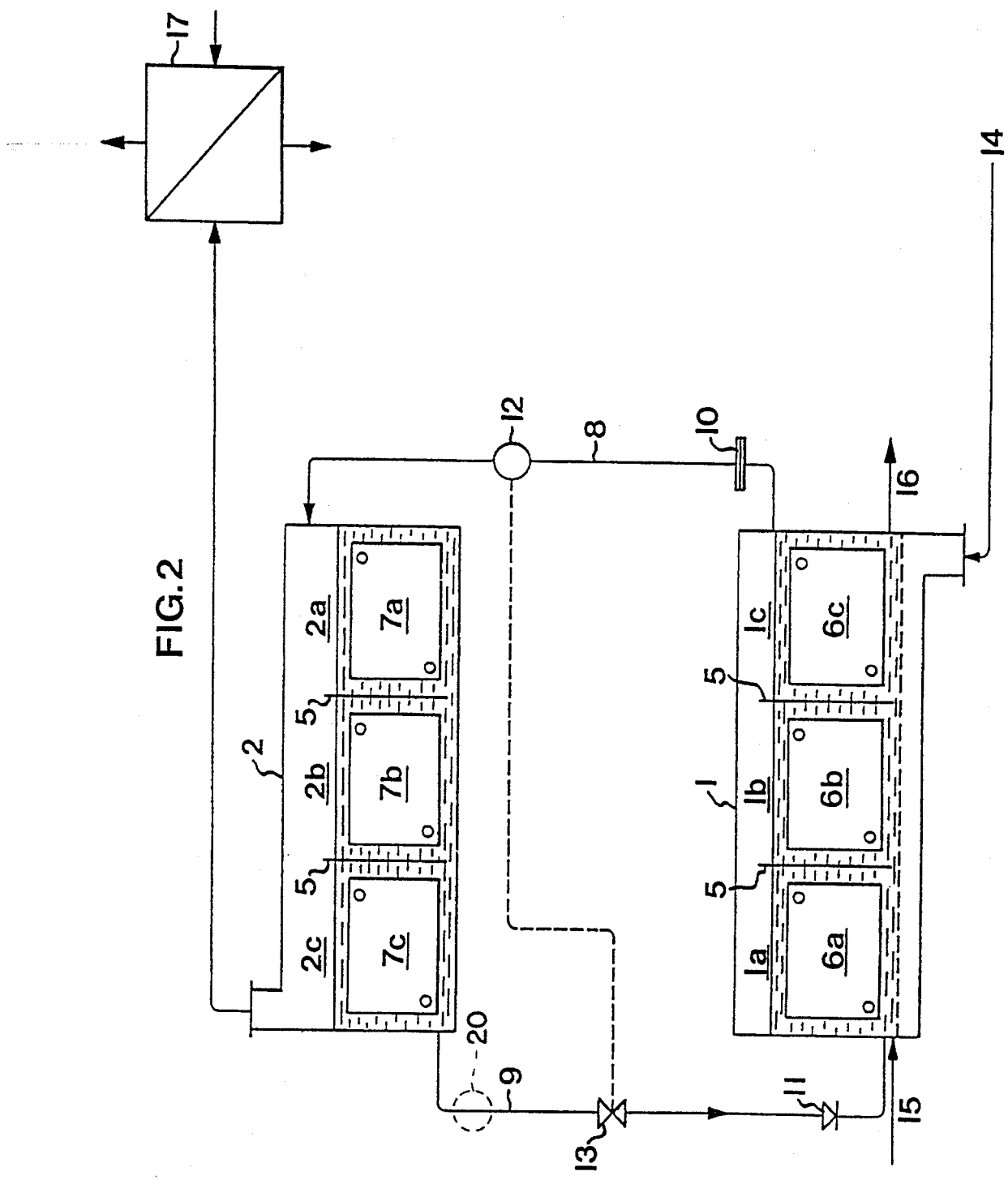

ABSORPTION MACHINE WITH MULTI-TEMPERATURE COMPARTMENTS

This invention relates to an absorption machine, namely a heat transformer or an absorption heat pump, having multi-temperature compartments in the absorber and/or the generator. To be more specific, the invention concerns an absorption cycle in which the absorber emits heating media of different temperatures and the generator utilises heating media of different temperatures. By the terms "absorption heat pump" and "heat transformer" is meant an absorption cycle in which heat is supplied to the generator at one temperature level and heat is removed from the absorber at another temperature level. In the absorption heat pump, the temperature is at its highest in the generator, whereas in the heat transformer, the temperature is at its highest in the absorber. Examples of pairs of working media used are $H_2O/NaOH$, $H_2O/KOH$, $H_2O/LiBr$, $H_2O/CsOH$, $H_2O$/hydroxide mixtures, $H_2O$/nitrate mixtures, and $NH_3/H_2O$.

Basically, an absorption cycle of this type comprises five main components, namely an absorber, an evaporator, a generator, a condenser, and a solution heat exchanger which is essential to the efficiency of the cycle. A solution of a pair of working media circulates through and between the absorber and the generator, a strong working-medium solution (hereinafter referred to as "strong solution", having a high concentration of working medium, often consisting of water) being supplied to the generator, and a weak working-medium solution (hereinafter referred to as "weak solution") being supplied to the absorber. Heat is supplied to the generator for evaporating the working medium, and heat generated when working medium in vapour state is absorbed (condensed) in the solution is removed from the absorber. The working-medium steam from the generator is supplied to the condenser, where it is condensed. The condensed working medium is supplied to the evaporator, where it is again evaporated, to be subsequently supplied to the absorber, where it is absorbed.

The working-medium solutions in the generator and the absorber have different temperature levels, and an effective heat exchange between the flows circulating between these two components is essential to obtain a reasonable degree of efficiency in the installation.

In a heat transformer, heat is supplied to the evaporator and the generator at a temperature level below that at which heat is removed from the absorber. About half of the total amount of heat supplied is recovered as useful heat at a higher temperature. In an absorption heat pump heat is supplied to the generator at a temperature level above that at which heat is removed from the condenser and the absorber. About twice as much heat as is supplied to the generator is recovered as useful heat in the condenser and the absorber.

In a heat transformer, the pressure in the generator and the condenser is lower than that in the absorber and the evaporator, while it is just the opposite in an absorption heat pump.

Swedish Patent Application 8703128-2 discloses an absorption machine having thermosiphon-induced auto-circulation and comprising an absorber, an evaporator, a generator, a condenser, and a solution heat exchanger arranged between the generator and the absorber. The working-medium solution is circulated through the absorber, the generator and the solution heat exchanger. The working-medium steam separated in the generator is circulated through the condenser and the evaporator, to be recycled to the working-medium solution in the absorber. This is achieved by arranging the absorber/evaporator and the generator/condenser on different levels, thereby to maintain the pressure difference between the absorber/evaporator and the generator/condenser required for auto-circulation.

In a heat transformer according to this system, only a single heating medium having one temperature is discharged from the absorber, whereas as a rule only a single heating medium having one temperature is used in the generator/evaporator. In an absorption heat pump, only a single heating medium having one temperature is used in the generator, whereas as a rule only a single heating medium having one temperature is discharged from the absorber/condenser.

DE-A-34 26 674 teaches an absorption heat pump comprising a multi-compartment absorption installation and a multi-compartment generation installation. Heat is supplied to the system from a low-temperature source (to the evaporator) and a high-temperature source (to the generator), while heat is emitted (from an absorber and a condenser) to the heating liquid, i.e. the absorption heat pump emits heat at one temperature only. This absorption heat pump is the result of further developments of well-known multiple-effect absorption machines.

In such systems as multiple-effect evaporators, complex distillation plants, crystallisation processes and drying, heat is available at many different temperatures and heat is required at many different temperatures. The absorption cycles described above take up and emit heating medium at one temperature only, which means that such systems would require many different heat transformers or absorption heat pumps, which would be very expensive.

The basic object of the invention is to provide an absorption machine in which heating media of different temperatures are discharged from the absorber and heating media of different temperatures are used in the generator, so that but a single absorption machine is needed in complicated systems of the type described above.

Another object of the invention is to provide an absorption machine which, as above, discharges heating media of different temperatures and uses heating media of different temperatures and which, in the absorber, can be supplied with a working medium in vapour state consisting of direct-injection steam from the system in which the absorption machine is integrated, a flow of fresh working-medium solution being supplied to the absorption machine and a contaminated working-medium solution being continuously drawn off, so that the content of contaminating matter from the direct-injection steam can be kept down.

According to the invention, these objects are achieved by an absorption machine having the characteristics recited in appended claim 1. Especially preferred embodiments of the invention are stated in appended subclaims 2–11. Furthermore, the invention concerns a method for operating the absorption machine, which has the characteristics recited in appended claim 12. Especially preferred modes of operation are stated in appended subclaims 13–18.

The invention is illustrated in some detail in the accompanying drawings, in which FIGS. 1 and 2 show two preferred embodiments of the inventive absorption machine.

The heat transformer shown in FIG. 1 is adapted to receive, from the system of which it forms an integral part, waste heat at different lower temperature levels, as well as to emit useful heat at different higher temperature levels. When the pair of working media used is, say, $H_2O/NaOH$, the considerable elevation of the boiling point of mixtures of water and NaOH enables high temperatures of the useful heat.

The heat transformer in FIG. 1 comprises the same main components as an ordinary heat transformer, namely an absorber 1, a generator 2, a condenser 3 and an evaporator 4, the generator 2 and the condenser 3 being disposed on a higher level than the absorber 1 and the evaporator 4 to enable circulation of a working-medium solution between and through the absorber 1 and the generator 2, the working medium separated in the generator 2 being caused to flow from the generator 2 through the condenser 3 and the evaporator 4 and to the working-medium solution in the absorber 1 without the use of any pumps, i.e. using the principle of auto-circulation.

The absorber 1 and the generator 2 are each divided into three compartments 1a, 1b, 1c and 2a, 2b, 2c, which are separated by partitions 5 leaving a gap for the steam communication at the top and a gap for liquid communication at the bottom between the different compartments in the absorber 1 and the generator 2. Thus, there is a constant pressure on the working-medium side in the absorber 1 as well as in the generator 2, where the different compartments constitute communicating vessels.

The compartments 1a, 1b, 1c, and 2a, 2b, 2c in the absorber 1 and the generator 2, respectively, each have a heat-exchanger assembly 6a, 6b, 6c and 7a, 7b, 7c, respectively, with separate inlets and outlets. The generator 2 and the absorber 1 are interconnected by a conduit 8 provided with an orifice plate 10 at its lower part, and by a conduit 9 provided with a non-return valve 11 at its lower part. A temperature sensor 12 is arranged in the conduit 8 between the orifice plate 10 and the generator 2. Further, a flow control valve 13 controlled by the temperature sensor 12 is provided in the conduit 9 between the generator 2 and the non-return valve 11.

A weak working-medium solution, such as H$_2$O/NaOH having a low concentration of the working medium H$_2$O, is supplied to the first compartment 1a of the absorber 1 from the generator 2 via the conduit 9. This weak solution is mixed with the working-medium solution already present in the compartment 1a, to which working medium in the form of steam condensing in (being absorbed by) the working-medium solution is simultaneously supplied at the bottom. The heat generated in the compartment 1a is absorbed by the heating medium in the heat-exchanger assembly 6a. Then, the working-medium solution is transferred to the adjacent communicating compartment 1b, to which is supplied more working medium in the form of steam. The heat generated in the compartment 1b has a lower temperature than that generated in the compartment 1a owing to the elevation of the boiling point here being less pronounced, since the solution has been concentrated with respect to the working medium. The heat generated in the compartment 1b is absorbed by the heating medium in the heat-exchanger assembly 6b, and this medium thus obtains a lower temperature than the heating medium in the heat-exchanger assembly 6a. Thereafter, the working-medium solution is further conveyed to the adjacent communicating compartment 1c. Also here, working medium in the form of steam is supplied, and the heat generated is absorbed by the heating medium in the heat-exchanger assembly 6c, and this medium thus obtains a lower temperature than the heating medium in the heat-exchanger assembly 6b owing to the working-medium solution being more and more concentrated with respect to the working medium. As a result, the three heat-exchanger assemblies in the absorber discharge heating media of progressively lower temperatures, as seen from 6a to 6c.

The working-medium solution from the compartment 1c is conveyed to the generator 2 via the conduit 8, at which point the hydrostatic pressure is reduced so that a small amount of the boiling working-medium solution is evaporated. By the thermosiphon effect thus produced, no pump is needed for conveying the solution. The orifice plate 10 is so dimensioned that the liquid passes without any appreciable pressure drop. Even a small amount of steam multiplies the pressure drop, for which reason substantially only liquid may pass the orifice plate 10. In this manner, the level of the liquid in the absorber is constantly maintained on a level with the outlet to the conduit 8. The temperature sensor 12 controls the boiling temperature in the conduit 8. If this temperature is too high, indicating too low a concentration of the working medium, the flow of the working-medium solution in the conduit 9 is throttled by means of the flow control valve 13. If the temperature is too low, indicating too high a concentration of the working medium, the flow control valve 13 is opened, such that more of the weak working-medium solution is supplied to the compartment 1a of the absorber 1. Thus, the flow of working medium circulating between the absorber 1 and the generator 2 is easily regulated.

The working-medium solution from the absorber 1 is introduced into the first compartment 2a of the generator 2. The working-medium solution absorbs heat from the heat-exchanger assembly 7a in the first compartment 2a, so that some of the working medium is evaporated and the boiling point of the working medium is increased. Then, the working-medium solution is transferred via the gap below the partition 5 to the adjacent communicating compartment 2b, and heat is absorbed from the heat-exchanger assembly 7b through the interior of which flows a heating medium warmer than the one that flows through the interior of the heat-exchanger assembly 7a. More of the working medium is evaporated, and the boiling point of the working-medium solution increases even more. Then, the working-medium solution is conducted below the partition 5 to the adjacent communicating compartment 2c, where more of the working medium is evaporated by heat transfer from an even warmer heating medium in the heat-exchanger assembly 7c. The thus-regenerated weak solution is recycled to the compartment 1a of the absorber 1.

The working-medium steam produced in the generator 2 is conveyed through the condenser 3 and the evaporator 4 and is recycled at the bottom of all the compartments in the absorber 1.

One thus obtains a heat transformer which is able to discharge many different heating media of different temperatures and which may utilise waste heat of different temperatures. A heat transformer according to the invention may well be integrated in such systems as multiple-effect evaporators, complex distillation plants, crystallisation processes and drying.

When the working medium consists of water, the working-medium steam supplied to the absorber may consist of process steam directly from, say, some suitable effect level in a multiple-effect evaporator, while the working-medium steam evaporated in the generator may be conveyed directly to an existing condenser (a so-called open cycle). The different heating media conveyed to the different compartments in the generator may consist of process steam and/or condensate from suitable levels. In this manner, it is possible, in accordance with the invention, to obtain an absorption heat pump or a heat transformer containing but two main components, namely the absorber and the generator, of which one or both operate according to the multiple-compartment principle. Owing to the low circulation of the working-medium solution between the absorber and the generator enabled by the present invention, the solution heat exchanger otherwise necessitated by reasons of efficiency may perfectly well be dispensed with.

One disadvantage impairing the above-mentioned open cycles is that contaminating matter in the process steam may accumulate in the working-medium solution. To avoid this, contaminated working-medium solution has to be continuously removed or drawn off, while at the same time clean working-medium solution is continuously supplied, production. By using the pair of working media $H_2O/NaOH$, which normally is a very expensive procedure. In the cellulose industry, NaOH is used in large quantities in the above disadvantage is easily obviated by supplying the NaOH needed in production via an open absorption cycle associated with e.g. the multiple-effect evaporation of black liquor. The clean working-medium solution may be supplied anywhere in the system, e.g. to the first compartment 1a of the absorber 1 or the first compartment 2a of the generator 2. Likewise, the separation of the contaminated working-medium solution may take place anywhere, e.g. in the last compartment 1c of the absorber 1 or the last compartment 2c of the generator 2. The bleeding techniques described here may also be applied to ordinary heat absorption pumps and heat transformers, which operate according to the single-compartment principle.

The heat transformer illustrated in FIG. 2 operates exactly as that illustrated in FIG. 1, excepting that the circulation of the working medium in vapour state is not a closed cycle. In the transformer in FIG. 2, use is made of direct-injection steam from the system of which the transformer forms an integral part, and this direct-injection steam may, as indicated in the foregoing, contain contaminating matter from the system. In order to avoid concentration of contaminating matter in the heat transformer, a flow of clean working-medium solution 15 is supplied to the first compartment 1a of the absorber 1, while a flow of contaminated working-medium solution 16 is removed from the last compartment 1c of the absorber 1. The working medium in vapour state separated in the generator 2 is conveyed e.g. to a condenser 17, where it is condensed.

The inventive designs described in the foregoing are but two of many conceivable designs applicable to heat transformers as well as absorption heat pumps. Thus, auto-circulation is not a requirement for making use of the invention. Of course, the working-medium solution may also be circulated with the aid of a means of conveyance, e.g. a pump 20. However, the multiple-compartment principle gives a much lower circulation than in The case of ordinary absorption machines, and it thus becomes easier both to maintain and to control a auto-circulating flow.

Also, the low circulation flow of the working-medium solution makes it possible to dispense with the solution heat exchanger absolutely necessary in ordinary heat transformers and absorption heat pumps for reasons of efficiency, which considerably reduces the costs of a heat transformer or an absorption heat pump designed in accordance with the invention.

The great advantage of the present invention is that only one inventive absorption machine is needed in such complex systems as distillation plants, crystallisation processes and drying, since the inventive absorption machine discharges heating media of different temperatures from the absorber and utilises heating media of different temperatures in the generator.

We claim:

1. An absorption machine operating with a pair of working media, the pair of working media including a working-medium solution and a working medium, the absorption machine comprising:

an absorber, the absorber including heat-exchanger assemblies;

a generator, the generator including heat-exchanger assemblies;

first and second conduits interconnecting the generator and the absorber; and the absorber and the generator being divided into two or more compartments, the two or more compartments being in communication with one another such that the working medium in the two or more compartments of the absorber is at a constant pressure and such that the working medium in the two or more compartments of the generator is at a constant pressure, and each of the two or more compartments having a heat-exchanger assembly with separate inlets and outlets.

2. An absorption machine operating with a pair of working media, the pair of working media including a working-medium solution and a working medium, the absorption machine comprising:

an absorber, the absorber including heat-exchanger assemblies;

a generator, the generator including heat-exchanger assemblies;

first and second conduits interconnecting the generator and the absorber; and at least one of the absorber and the generator being divided into two or more compartments, the two or more compartments being in communication with one another and each of the two or more compartments having a heat-exchanger assembly with separate inlets and outlets, wherein liquid and steam communication is provided, respectively, at bottoms and tops of partitions separating the two or more compartments.

3. An absorption machine as set forth in claim 1, wherein the generator and the absorber are disposed on different levels.

4. An absorption machine as set forth in claim 1, wherein the second conduit conducts working-medium solution from the generator to the absorber and includes means for conveying the solution.

5. An absorption machine operating with a pair of working media, the pair of working media including a working-medium solution and a working medium, the absorption machine comprising:

an absorber, the absorber including heat-exchanger assemblies;

a generator, the generator including heat-exchanger assemblies;

first and second conduits interconnecting the generator and the absorber; and at least one of the absorber and the generator being divided into two or more compartments, the two or more compartments being in communication with one another and each of the two or more compartments having a heat-exchanger assembly with separate inlets and outlets, wherein an orifice plate (10) is arranged close to the absorber in the first conduit, the first conduit conducting working-medium solution from the absorber to the generator, and a non-return valve is disposed in the second conduit, the second conduit conducting working-medium solution from the generator to the absorber.

6. An absorption machine as set forth in claim 5, wherein a temperature sensor is disposed between the orifice plate and the generator in the first conduit.

7. An absorption machine as set forth in claim 6, wherein a flow control valve, the flow control valve being controlled by the temperature sensor, is disposed between the non-return valve and one of the generator and means for conveying working-medium solution.

8. An absorption machine as set forth in claim 1, wherein the heat-exchanger assemblies are of the lamella, tube or spiral type.

9. An absorption machine as set forth in claim 1, wherein the pair of working media is selected from the group consisting essentially of $H_2O/NaOH$, $H_2O/KOH$, $H_2O/LiBr$, $H_2O/CsOH$, $H_2O$/hydroxide mixtures, $H_2O$/nitrate mixtures, and $NH_3/H_2O$.

10. An absorption machine as set forth in claim 1, further comprising an inlet for clean working-medium solution, and an outlet for continuously bleeding contaminated working-medium solution.

11. An absorption machine as set forth in claim 10, wherein the inlet for clean working-medium solution is arranged in a first compartment of the absorber, and the outlet for continuously bleeding contaminated working-medium solution is arranged in a last compartment of one of the absorber or the generator.

12. A method for operating an absorption machine, the absorption machine comprising an absorber, the absorber including heat-exchanger assemblies, and a generator, the generator including heat-exchanger assemblies, the absorber and the generator each being divided into at least two compartments, the at least two compartments being in communication with one another and each of the two compartments having a heat-exchanger assembly, the each heat exchanger assembly having separate inlets and outlets, the method comprising the steps of:

supplying working-medium solution in a vapor state to a first compartment of the absorber and drawing working-medium solution off from a last compartment of the absorber so as to impart to the working-medium solution a gradually higher concentration of working medium and a gradually lower temperature;

transferring the working-medium solution drawn off in the last compartment of the absorber to a first compartment of the generator;

supplying the heat-exchanger assemblies in the compartments of the generator with steam of gradually higher temperatures from a heat-exchanger assembly of the first compartment of the generator to a heat-exchanger assembly of a last compartment of the generator so as to impart to the working-medium solution a gradually lower concentration of working medium and a gradually higher temperature when flowing through the generator.

13. A method as set forth in claim 12, wherein the working-medium solution is transferred through openings at bottoms of partitions separating the compartments of the absorber and the generator.

14. A method as set forth in claim 12, wherein the absorber and the generator are disposed at different levels such that the working-medium solution auto-circulates through the absorber and the generator by the thermosiphon effect.

15. A method as set forth in claim 12, wherein the working-medium solution is circulated through the absorber and the generator by means for conveying the solution.

16. A method as set forth in claim 12, comprising the further steps of sensing a temperature in a conduit conducting working-medium solution from the absorber to the generator and controlling the flow rate of the working-medium solution in response to a temperature sensed.

17. A method as set forth in claim 12, wherein the absorption machine forms part of a system, the working medium solution in the vapor state supplied to the absorber includes direct-injection steam from the system, the method comprising the further steps of supplying a flow of clean working-medium solution to the absorption machine from the system, and separating a contaminated working-medium solution from the absorption machine.

18. A method as set forth in claim 17, wherein the flow of clean working-medium solution is supplied to the first compartment of the absorber, and the contaminated working-medium solution is separated from one of the last compartment of the absorber and the last compartment of the generator.

19. An absorption machine as set forth in claim 2, wherein the generator and the absorber are disposed on different levels.

20. An absorption machine as set forth in claim 2, wherein the second conduit conducts working-medium solution from the generator to the absorber and includes means for conveying the solution.

21. A method as set forth in claim 13, wherein the absorber and the generator are disposed at different levels such that the working-medium solution auto-circulates through the absorber and the generator by the thermosiphon effect.

22. A method as set forth in claim 13, wherein the working medium solution is circulated through the absorber and the generator by means for conveying the solution.

23. A method as set forth in claim 13, comprising the further steps of sensing a temperature in a conduit conducting working-medium solution from the absorber to the generator and controlling the flow rate of the working-medium solution in response to a temperature sensed.

24. A method as set forth in claim 14, comprising the further steps of sensing a temperature in a conduit conducting working-medium solution from the absorber to the generator and controlling the flow rate of the working-medium solution in response to a temperature sensed.

25. A method as set forth in claim 15, comprising the further steps of sensing a temperature in a conduit conducting working-medium solution from the absorber to the generator and controlling the flow rate of the working-medium solution in response to a temperature sensed.

26. A method as set forth in claim 13, wherein the absorption machine forms part of a system, the working medium solution in the vapor state supplied to the absorber includes direct-injection steam from the system in which the absorption machine is integrated, the method comprising the further steps of supplying a flow of clean working-medium solution to the absorption machine from the system, and separating a contaminated working-medium solution from the absorption machine.

27. A method as set forth in claim 14, wherein the absorption machine forms part of a system, the working medium solution in the vapor state supplied to the absorber includes direct-injection steam from the system, the method comprising the further steps of supplying a flow of clean working-medium solution to the absorption machine from the system, and separating a contaminated working-medium solution from the absorption machine.

28. A method as set forth in claim 15, wherein the absorption machine forms part of a system, the working medium solution in the vapor state supplied to the absorber includes direct-injection steam from the system, the method comprising the further steps of supplying a flow of clean working-medium solution to the absorption machine from the system, and separating a contaminated working-medium solution from the absorption machine.

29. A method as set forth in claim 16, wherein the absorption machine forms part of a system, the working medium solution in the vapor state supplied to the absorber includes direct-injection steam from the system in which the absorption machine is integrated, the method comprising the further steps of supplying a flow of clean working-medium solution to the absorption machine from the system, and separating a contaminated working-medium solution from the absorption machine.

* * * * *